(12) United States Patent
Jones

(10) Patent No.: US 7,044,448 B1
(45) Date of Patent: May 16, 2006

(54) RAILING HAVING METAL BALUSTERS ISOLATED FROM CORROSION

(75) Inventor: Kelly D. Jones, High Ridge, MO (US)

(73) Assignee: Deckorators, Inc., St. Louis, MO (US)

( * ) Notice: Subject to any disclaimer, the term of this patent is extended or adjusted under 35 U.S.C. 154(b) by 0 days.

(21) Appl. No.: 10/437,468

(22) Filed: May 14, 2003

(51) Int. Cl.
*E04H 17/14* (2006.01)

(52) U.S. Cl. .......................... 256/19; 256/22; 256/59; 256/65.01; 256/66

(58) Field of Classification Search ............... 256/1, 256/19, 22, 59, 65.01, 66, 68–70, 65.15; 52/720.2, 301; 16/2.1–2.5; 403/227
See application file for complete search history.

(56) References Cited

U.S. PATENT DOCUMENTS

| | | | |
|---|---|---|---|
| 1,797,883 A | | 3/1931 | Strubel |
| 3,099,057 A | * | 7/1963 | Cook ........................ 16/2.1 |
| 3,239,196 A | * | 3/1966 | Blum et al. .................... 256/67 |
| 3,278,209 A | * | 10/1966 | Winikoff .................. 256/65.01 |
| 3,420,013 A | * | 1/1969 | Alvarado ..................... 52/301 |
| 3,506,999 A | * | 4/1970 | Neher ......................... 16/2.1 |
| 3,810,341 A | | 5/1974 | Holz |
| 3,955,800 A | * | 5/1976 | Russo ......................... 256/59 |
| 4,017,918 A | * | 4/1977 | Harris |
| 4,223,413 A | * | 9/1980 | Dresher et al. ............... 256/22 |
| 4,403,767 A | | 9/1983 | Basey |
| 4,786,203 A | * | 11/1988 | Conner et al. |
| 4,886,245 A | | 12/1989 | Manzo |
| 5,419,538 A | | 5/1995 | Nicholas et al. |
| 5,474,395 A | | 12/1995 | Miki |
| 5,557,893 A | * | 9/1996 | Bowls |
| 5,605,023 A | * | 2/1997 | Biernazki ..................... 52/301 |
| 6,126,145 A | * | 10/2000 | Mohr |
| 6,126,148 A | | 10/2000 | Lesenskyj |
| 6,305,670 B1 | | 10/2001 | Ward et al. |
| 6,305,671 B1 | * | 10/2001 | Valentine ..................... 256/68 |
| 6,308,937 B1 | | 10/2001 | Pettit |
| 6,311,957 B1 | | 11/2001 | Driscoll et al. |
| 6,394,422 B1 | | 5/2002 | Jones et al. |

* cited by examiner

*Primary Examiner*—Daniel P. Stodola
*Assistant Examiner*—Victor MacArthur
(74) *Attorney, Agent, or Firm*—Grace J. Fishel

(57) ABSTRACT

A railing system for porches, decks, steps, ramps and the like having a top and bottom rail formed of wood containing a wood preservative that is corrosive to aluminum, aluminum alloys and the like. The system has hollow metal balusters formed of metals which may be harmed by the corrosive effects of the wood preservative. The metal balusters are protected from the corrosive effects of the wood preservative by inert fixtures interposed between the wooden components of the railing system and the metal of the balusters. The fixtures may be joined by runners that simplify installation of the railing system.

10 Claims, 4 Drawing Sheets

RAILING HAVING METAL BALUSTERS ISOLATED FROM CORROSION

BACKGROUND OF THE INVENTION

1. Field of the Invention

The present invention relates to railings made with treated lumber and metal balusters wherein the balusters are isolated from corrosion by the lumber.

2. Brief Description of the Prior Art

It has been found that an attractive fence or railing resembling a wrought iron fence can be made with hollow metal balusters mounted in holes drilled in top and bottom wooden rails. One such construction is described in our earlier patent (U.S. Pat. No. 6,394,422 to Jones et al.) incorporated by reference herein.

In recent years there has been a change in the chemicals employed for treating lumber used in an outdoor environment. Arsenic, the primary component used to preserve wood from deterioration, has been eliminated. To compensate for the lack of arsenic, the amount of copper containing chemicals impregnated into the wood has been greatly increased. The increased copper content has caused the metal balusters, when formed of aluminum, to corrode, especially at the point of contact with the wood. The problem of corrosion is increased in the outdoor environment where the components are exposed to moisture, i.e., from rain, dew and other sources.

U.S. Pat. Nos. 1,797,883, 3,810,341, 4,403,767, 4,886,245, 5,419,538, 5,474,395, 6,126,148, 6,305,670, 6,308,937, 6,311,957, and 6,394,422 are incorporated by reference herein.

BRIEF SUMMARY OF THE INVENTION

The present invention provides a method and structure for rapid and inexpensive construction of railing having balusters formed of metal tubes. The balusters may be made of metal, such as aluminum, aluminum alloys and like materials.

The invention provides a structure which protects the balusters from the corrosive effects of wood treated with copper containing wood preservatives and the like. In a preferred embodiment of the invention a noncorrosive fixture provides a barrier flange positioned between the baluster tube and a supporting rail.

A further embodiment adds an installation guide mechanism which assists in rapidly positioning an array of fixtures on a supporting rail for rapid installation of the balusters. This mechanism eliminates the need for time consuming hand measuring and layout of the fixtures.

It is thus an object of this invention to provide a railing system which may be easily and rapidly constructed from pressure treated wood rails and metal balusters. It is another object to provide a railing system in which the metal balusters are protected from corrosion by the wooden rails. Other objects and features of the invention will be in part apparent and in part pointed out hereinafter.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 1:
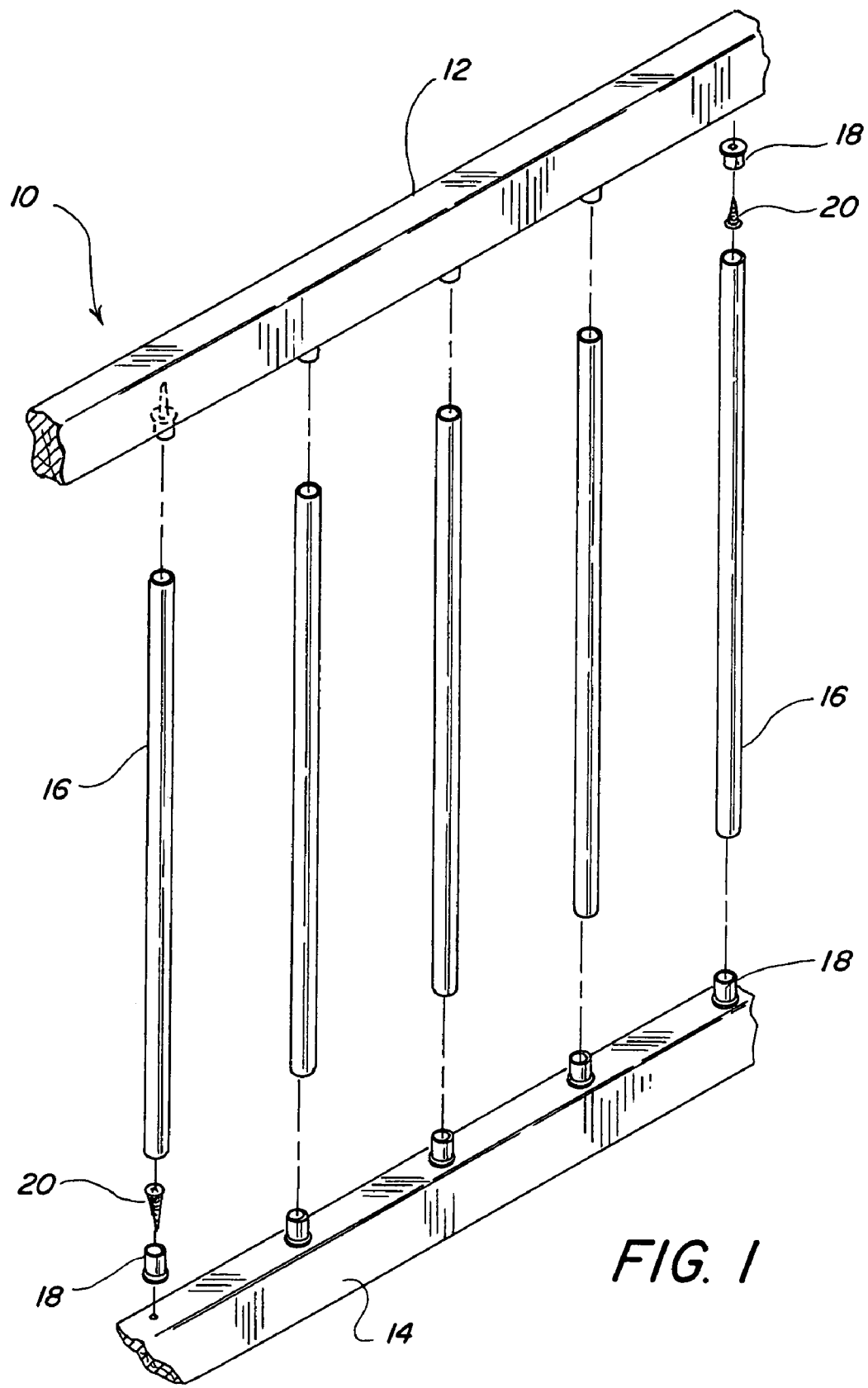
FIG. 1 is an exploded perspective view of a railing in accordance with the present invention.

Referring to FIG. 1, a section of railing 10 according to the invention is shown. Railing 10 has a horizontal top rail 12 and a horizontal bottom rail 14 with a plurality of balusters 16 placed between the top and bottom rails 14, 16. Balusters 16 may be made from straight sections of round aluminum tubing, but is will be appreciated that they may be made from another material, such as another metal, and may have a different cross-section and/or a more complex shape.

Figures 2, 3:
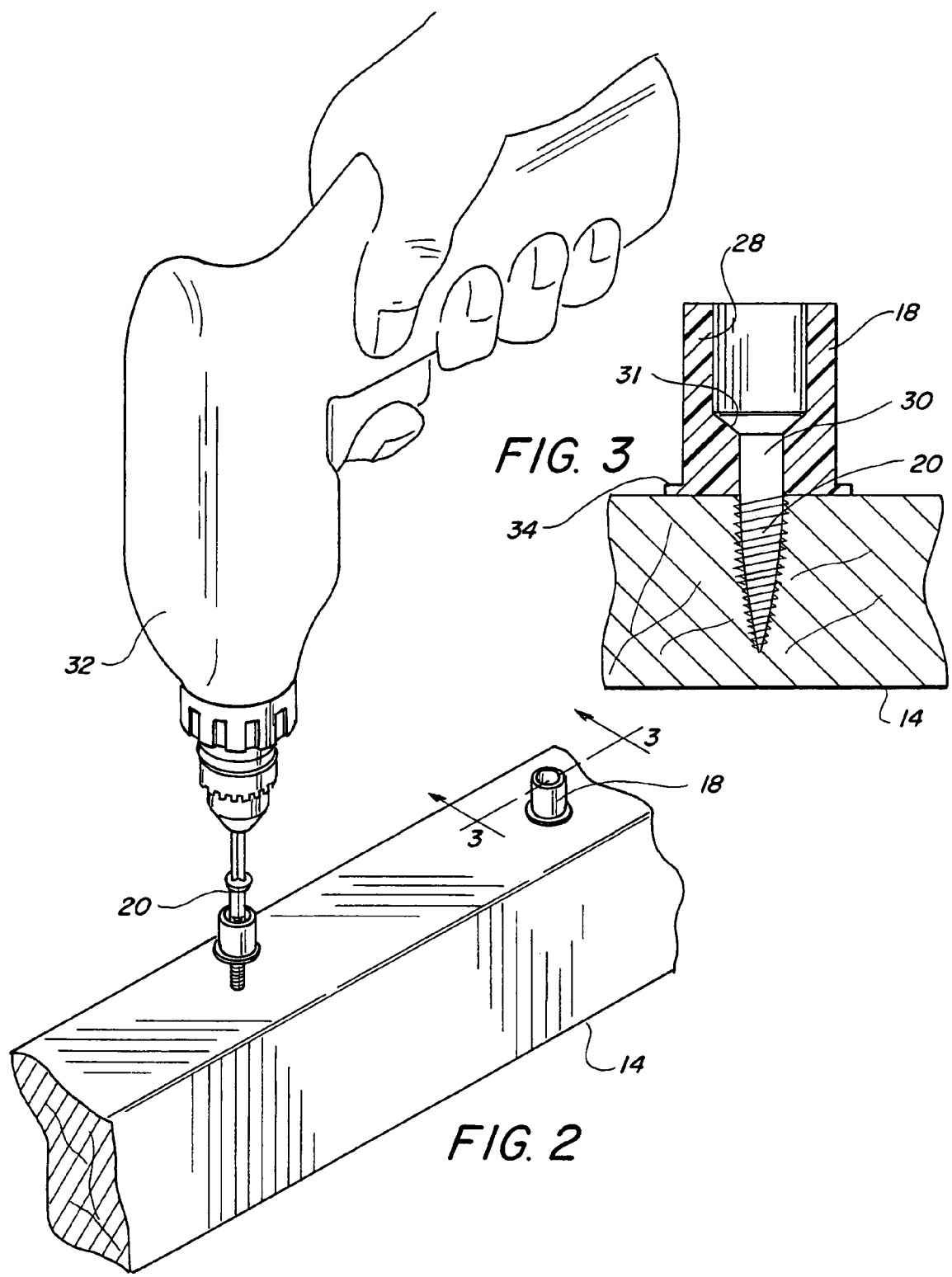
FIG. 2 is a broken view of a detail of the invention.
FIG. 3 is a cross-sectional view taken along the plane 3—3 in FIG. 2.

Balusters 16 are installed on rails 12 and 14 using fixtures 18 of the invention. Fixtures 18 are installed on bottom rail 14 using screws 20, as shown in FIGS. 2 and 3. Fixtures 18 are installed at appropriate intervals along bottom rail 14, as shown in FIG. 1, and balusters 16 are placed over fixtures 18 with fixtures 18 snugly received in the bottoms of balusters 16. Fixtures 18 are also installed along top rail 14 at matching intervals and top rail 14 lowered to place its fixtures 18 snugly into the tops of balusters 16, as shown.

Figure 4:
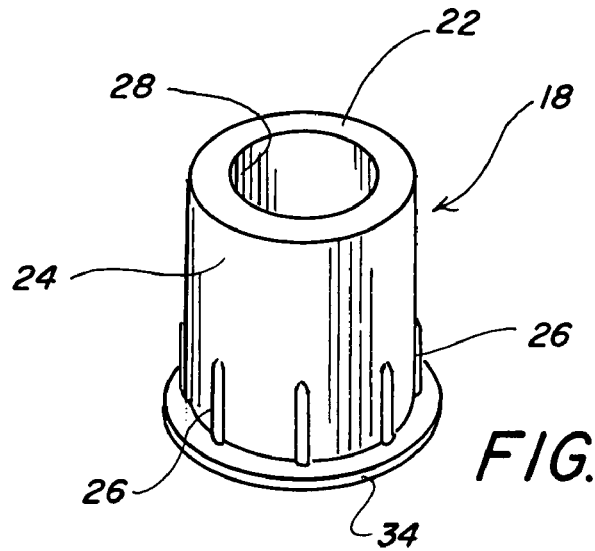
FIG. 4 is a perspective view of a fixture of the invention.

As shown in FIGS. 2, 3 and 4, fixtures 18 have a hollow body 22 with an exterior 24 shaped to conform to in inner configuration of balusters 16 and tapered for snug force fit entry therein. Exterior 24 is shown as having a round cross-sectional shape for round balusters 16 of FIG. 1, but may be of a variety of cross-sections such as square, rectangular, oval or the like to match balusters 16 having other internal and external configurations.

With continuing reference to FIG. 4, fixtures 18 may have a plurality of longitudinal ribs 26 thereon. Ribs 26 assist in providing a snug fit between balusters 16 and fixtures 18. As shown in FIGS. 3 and 4, fixtures 18 may be hollow having a central cavity 28 therein. Central cavity 28 may terminate in an opening 30 at the bottom of fixtures 18. Fasteners, such as screws 20 or other fasteners, may be received in central cavity 28 and extend through opening 30 which forms a collar through which the shank of fastener 20 passes to join fixtures 18 to upper and lower rails 12, 14. Opening 30 includes an abutment shoulder 31 against which the head of fastener 20 is stopped. As shown in FIG. 2, screws 20 may be readily installed using a power driver 32.

Figure 8:
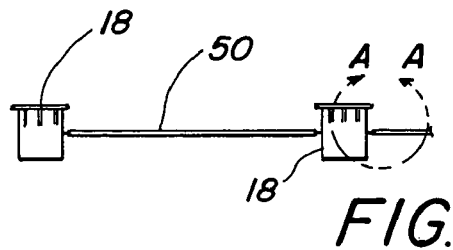
FIG. 8 is a detail in side elevation and on an enlarged scale of two fixtures of the array shown in FIG. 5; and, FIG. 8A is a detail in further enlarged scale taken along line A—A in FIG. 8.
Figure 8A:
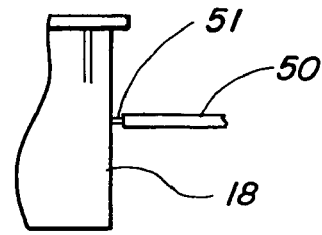

Referring to FIGS. 3, 4 and 8, fixtures 18 are provided with a flange 34 at the terminus of fixtures 18, as shown. Flange 34 acts as a stop against which balusters 16 are seated, when received therein, and spaces balusters 16 from rails 12 or 14 on which balusters 16 are installed. In place, flange 34 of fixture 18 acts as a corrosion barrier by keeping balusters 16 out of contact with rails 12 and 14 which may contain a corrosive wood preservative.

Figure 6:
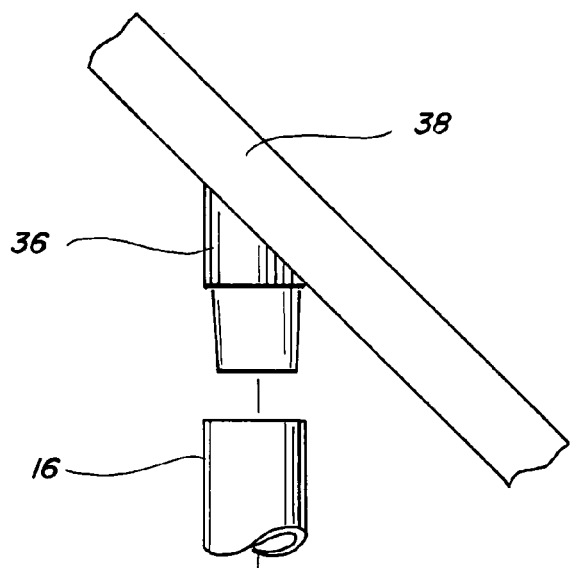
FIG. 6 is an exploded side view of an alternative railing according to the invention.
Figure 7:
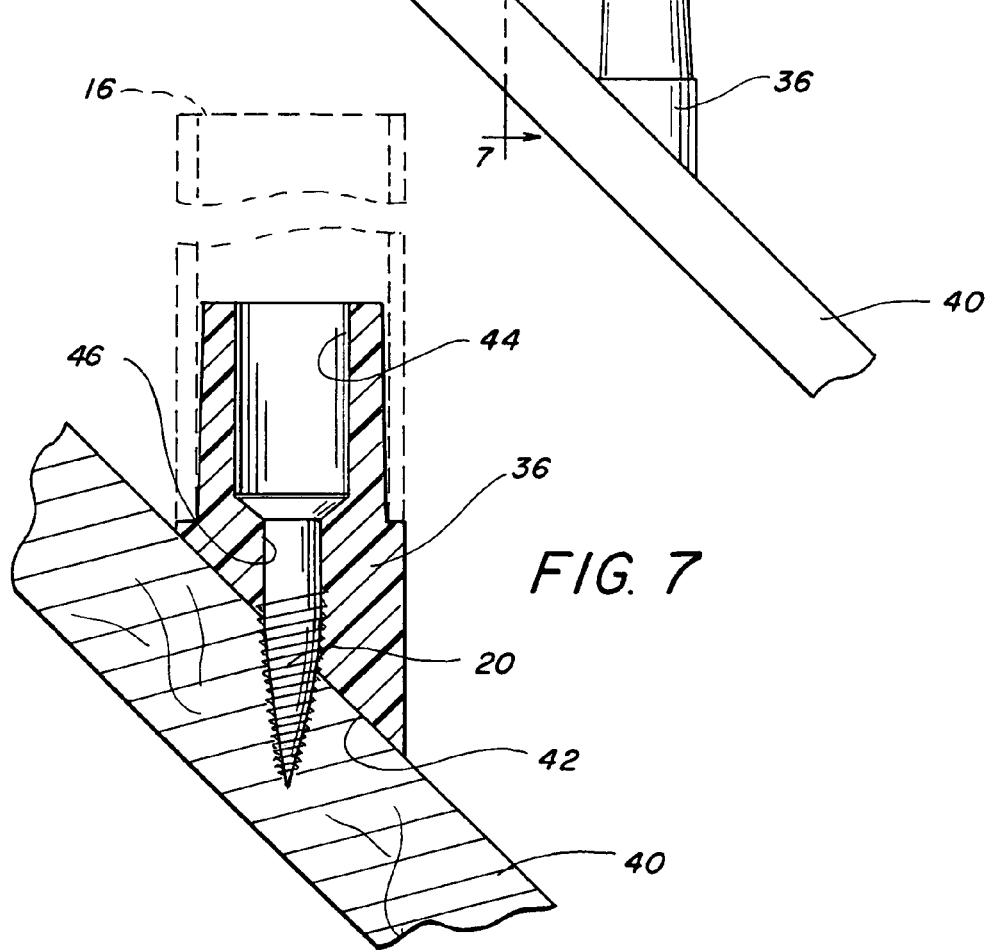
FIG. 7 is a cross-sectional view taken along the plane 7—7 in FIG. 6.

Referring to FIGS. 6 and 7, an alternative embodiment is shown. A second fixture 36 may be used with an inclined top rail 38 and an inclined bottom rail 40, as shown. Fixture 36 may have an inclined bottom surface 42 to match the angle of inclination of top rail 38 and bottom rail 40. Inclined top rail 38 and bottom rail 40 are typically installed along steps or ramps, as is known in the art. Balusters 16 may be installed using fixtures 36, as shown in FIGS. 6 and 7. Typically, balusters 16 will extend vertically, even though top rail 38 and bottom rail 40 are inclined to the vertical.

Fixtures 36 may have a central cavity 44, similar to central cavity 28 described above. Central cavity 44 may also terminate in an opening 46, similar to opening 30 described above. Fasteners, such as screws 20 may be received through central cavity 44 and opening 46 to join fixtures 36 to upper and lower rails 38, 40, as shown in FIGS. 6 and 7. Balusters 16, shown in phantom in FIG. 7, may be installed in upper rail 38 and lower rail 40 as described above.

Fixtures 36 also may have flanges, such as circumferential flanges 48, which act as a stop for balusters 16 and space balusters 16 from upper rail 38 and lower rail 40. When so installed, flanges 48 of fixtures 36 provide a corrosion barrier by keeping balusters 16 out of contact with wood which may contain a corrosive preservative.

Fixtures 18 and 36 may be fabricated from a variety of conventional material. Nonconductive ceramics, glass, rubber compounds and plastics may be used. Preferred materials are the conventional chemically inert or corrosion resistant polymers such as polyethylenes, polypropylenes, vinyl polymers, polyamidenylon polymers, polyethers and polyesters, including mixtures and copolymers thereof. These materials are strong, durable and inexpensive and possess the preferred balance of flexibility and rigidity. It has been found that if sufficiently elastic polymers are used a single embodiment of fixture 36 may be used for railings placed at a range of angles of inclination. The flexibility of the elastomer provides sufficient compliance to allow fixture 36 to distort to conform to the angle of inclination of upper rail 38 and lower rail 40. The compliance may be enhanced by providing transverse grooves, not shown, in bottom surface 42 of fixture 36, if desired.

Figure 5:
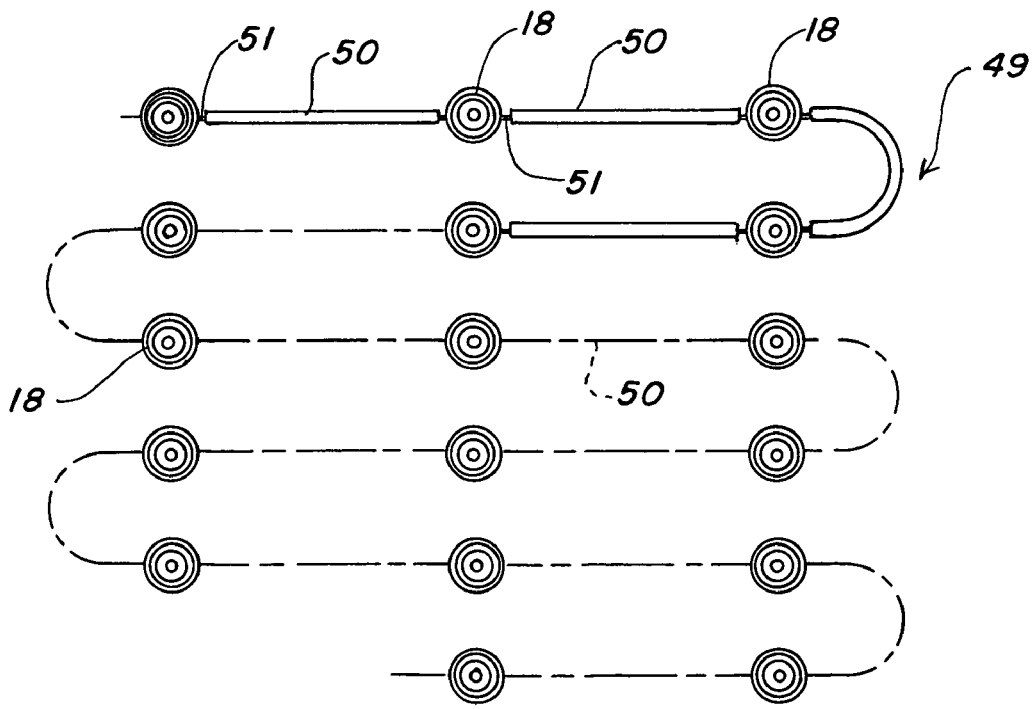
FIG. 5 is a top plan view of a joined array of fixtures such as that shown in FIG. 4.

FIGS. 5 and 8 show an alternative embodiment of fixtures 18 or 36 arranged as an array 49. By using an injection moldable polymer, such as an injection moldable polyethylene, array 49 of fixtures 18 can be molded as a unit. Fixtures 18 are joined by runners 50 formed of thin strips of polymer which are molded with the fixtures 18. Runners 50 can be sized in length to space fixtures 18 or 36 to provide the appropriate spacing for balusters 16, for example runners 50 can provide a spacing of 4.5 inches between adjacent balusters 16. By using runners 50 to provide the spacing between adjacent balusters 16 on top rail 12 and bottom rail 14, railing 10 can be constructed in a minimum of time since the step of hand laying out the location of the fixtures 18 can be eliminated.

Runners may be provided with weakened areas 51 adjacent to fixtures 18, 36, as shown in FIGS. 5 and 8, spaced above flanges 34, 48, respectively. When the installation of fixtures 18, 36 on runners 50 has been completed, balusters 16 sever weakened areas 51 as the balusters are installed over fixtures 18, 36 such that runners 50 may be removed and discarded.

While fixtures 18, 36 were originally developed for use with wooden rails treated with preservatives, the fixtures may be used with untreated wood such as cedar or with synthetic materials. With these materials, fixtures 18, 36 provide for easy assembly of a railing system because the rails need not be drilled to receive balusters 16. This is a significant advantage in the case of synthetic materials which may be soft and weakened by drilling. It will therefore be understood that fixtures used with rails which do not corrode the metal balusters are within the claims to the fixtures.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. A railing system having a top rail and a bottom rail, the top rail and the bottom rail being spaced apart and formed of wood containing a wood preservative, the railing system containing metal components, the wood preservative being electrolytically corrosive to the metal components of the railing system, the metal components of the railing system including tubular metal balusters extending between the top rail and the bottom rail, the tubular metal balusters having terminal ends, the terminal ends of the tubular metal balusters having protective fixtures thereon, each fixture having a hollow body with an exterior shaped to conform to an inner configuration of the tubular metal balusters and tapered towards a first end for snug force fit entry therein, said body having a hollow central cavity tapered towards a second end into a collar through which a shank of a fastener passes, said collar having an abutment shoulder against which a head of the fastener is stopped for joining the fixture to one of the top or bottom rails, said body having a flange at the second end of the hollow central cavity against which one of the terminal ends of the balusters is seated, said flange spacing the said one of the terminal ends of the tubular metal balusters out of contact with one of the top and bottom rails.

2. The railing system of claim 1 wherein the protective fixtures are formed of a chemically inert material.

3. The railing system of claim 2 wherein the inert material is selected from the group consisting of polyethylenes, polypropylenes, polyamides, polyvinyls, polyethers and polyesters including mixtures and copolymers thereof.

4. The railing system of claim 2 wherein adjacent protective fixtures are joined by runners of the chemically inert material.

5. A railing system comprising a fixture, a fastener and a wood rail, said fixture formed of a chemically inert material isolating tubular metal balusters from rails formed of wood treated with a wood preservative that is electrolytically corrosive to the metal balusters, said fixture comprising a hollow body having first and second ends with an exterior shaped to conform to an inner configuration of the tubular metal balusters and tapered towards the first end for snug force fit entry therein, said body having a hollow central cavity tapered towards the second end into a collar forming a tapered abutment shoulder through which a shank of the fastener passes and against which a head of the fastener is stopped for joining the fixture to the wooden rail, wherein the abutment shoulder is located intermediate said first and second ends of the body, said body having an outwardly extending flange at the second end against which the balusters are seated, said flange acting as a corrosion barrier between the baluster and the wood rail.

6. The fixture of claim 5 wherein the inert material is selected from the group consisting of polyethylenes, polypropylenes, polyamides, polyvinyls, polyethers and polyesters including mixtures and copolymers thereof.

7. The fixture of claim 5 including a severed runner formed of the chemically inert material for joining the fixture to an adjacent fixture, prior to final assembly at a predetermined distance for spacing adjacent balusters between top and bottom rails.

8. The fixture of claim 7 wherein prior to final assembly the runner is attached to the fixture above the flange and includes a weakened portion adjacent the fixture during final assembly whereby the runner is severed from the fixture when the fixture is inserted into the baluster.

9. The fixture of claim 5 wherein the body has an inclined bottom surface to accommodate inclined top and bottom rails.

10. The fixture of claim 9 wherein the chemically inert material is flexible to allow the fixture to conform to top and bottom rails having different angles of inclination.

* * * * *